(12) United States Patent
Garcia et al.

(10) Patent No.: US 10,647,332 B2
(45) Date of Patent: May 12, 2020

(54) SYSTEM AND METHOD FOR NATURAL-LANGUAGE VEHICLE CONTROL

(71) Applicant: Harman International Industries, Incorporated, Stamford, CT (US)

(72) Inventors: Juan Garcia, Hoffman Estates, IL (US); Stephen Moore, Grayslake, IL (US)

(73) Assignee: HARMAN INTERNATIONAL INDUSTRIES, INCORPORATED, Stamford, CT (US)

( * ) Notice: Subject to any disclaimer, the term of this patent is extended or adjusted under 35 U.S.C. 154(b) by 0 days.

(21) Appl. No.: 15/702,641

(22) Filed: Sep. 12, 2017

(65) Prior Publication Data

US 2019/0077414 A1    Mar. 14, 2019

(51) Int. Cl.
| | |
|---|---|
| *B60W 50/00* | (2006.01) |
| *B60W 50/10* | (2012.01) |
| *G01C 21/36* | (2006.01) |
| *B62D 15/02* | (2006.01) |
| *G05D 1/02* | (2020.01) |
| *G05D 1/00* | (2006.01) |

(Continued)

(52) U.S. Cl.
CPC .......... *B60W 50/10* (2013.01); *B62D 15/025* (2013.01); *G01C 21/3602* (2013.01); *G01C 21/3608* (2013.01); *G05D 1/0016* (2013.01); *G05D 1/0088* (2013.01); *G05D 1/0231* (2013.01); *G05D 1/0238* (2013.01); *G06F 17/28* (2013.01); *G06K 9/00805* (2013.01); *G10L 15/22* (2013.01); *G10L 15/265* (2013.01); *B60W 2420/42* (2013.01); *B60W 2540/02* (2013.01); *B60W 2900/00* (2013.01); *G05D 2201/0212* (2013.01); *G10L 2015/223* (2013.01)

(58) Field of Classification Search
None
See application file for complete search history.

(56) References Cited

U.S. PATENT DOCUMENTS

| | | | | |
|---|---|---|---|---|
| 8,430,192 | B2 * | 4/2013 | Gillett | B60K 1/04 180/65.51 |
| 8,457,827 | B1 * | 6/2013 | Ferguson | G05D 1/00 701/23 |

(Continued)

*Primary Examiner* — Jonathan M Dager
(74) *Attorney, Agent, or Firm* — Gordon & Rees LLP

(57) ABSTRACT

The present disclosure relates to systems, devices and methods for vehicle control with natural-language guidance instructions. In one embodiment, a method is provided for control vehicle operation based on natural-language guidance instructions and image data detected by a camera mounted to a vehicle. One or more targets may be identified based on the guidance instructions to identifying vehicle position and/or operation. Object detection may be performed on the image data and control commands may be determined in response to the object detection. Operation of the vehicle may be controlled based on the control command. Natural-language guidance instructions can allow for directions and/or destinations to be provided without an operator or passenger of the vehicle having an address or map identifier of a destination. Processes and configurations are provided for confirming natural-language instructions and assessing image data to control vehicle operation.

20 Claims, 5 Drawing Sheets

(51) Int. Cl.
   *G06F 17/28* (2006.01)
   *G06K 9/00* (2006.01)
   *G10L 15/22* (2006.01)
   *G10L 15/26* (2006.01)

(56) References Cited

U.S. PATENT DOCUMENTS

| | | | |
|---|---|---|---|
| 8,903,727 B2* | 12/2014 | Comerford | G10L 15/22 704/246 |
| 9,194,168 B1* | 11/2015 | Lu | E05F 15/70 |
| 9,493,169 B2* | 11/2016 | Ebner | G01C 21/3629 |
| 9,754,490 B2* | 9/2017 | Kentley | G06K 9/00805 |
| 9,953,535 B1* | 4/2018 | Canavor | G08G 1/164 |
| 9,974,422 B2* | 5/2018 | Lee | A47L 9/2815 |
| 10,031,519 B2* | 7/2018 | Yamada | G05D 1/0016 |
| 10,048,683 B2* | 8/2018 | Levinson | G01S 7/4972 |
| 10,083,605 B2* | 9/2018 | Sendhoff | G08G 1/0967 |
| 2006/0004486 A1* | 1/2006 | Yoshikawa | B60W 50/14 700/245 |
| 2009/0228204 A1* | 9/2009 | Zavoli | G01C 21/30 701/532 |
| 2010/0184011 A1* | 7/2010 | Comerford | G10L 15/26 434/321 |
| 2010/0304640 A1* | 12/2010 | Sofman | A63H 17/40 446/456 |
| 2011/0130956 A1* | 6/2011 | Tracton | G01C 21/3644 701/533 |
| 2011/0184639 A1* | 7/2011 | Holsinger | G01C 21/3629 701/533 |
| 2011/0288762 A1* | 11/2011 | Kuznetsov | G01C 21/32 701/532 |
| 2012/0083964 A1* | 4/2012 | Montemerlo | G05D 1/0214 701/26 |
| 2012/0173069 A1* | 7/2012 | Tsimhoni | G01C 21/365 701/25 |
| 2012/0287284 A1* | 11/2012 | Jacobsen | G06F 1/163 348/158 |
| 2013/0218453 A1* | 8/2013 | Geelen | G01C 21/3626 701/410 |
| 2014/0097748 A1* | 4/2014 | Kato | B60Q 9/008 315/77 |
| 2014/0121883 A1* | 5/2014 | Shen | B62D 15/0285 701/28 |
| 2014/0142948 A1* | 5/2014 | Rathi | G06F 3/167 704/270.1 |
| 2014/0365228 A1* | 12/2014 | Ng-Thow-Hing | G02B 27/01 704/275 |
| 2015/0338849 A1* | 11/2015 | Nemec | G05D 1/0055 701/25 |
| 2015/0344040 A1* | 12/2015 | Heckmann | B60W 50/08 701/1 |
| 2016/0018237 A1* | 1/2016 | Rosario | G01C 21/3602 701/516 |
| 2016/0104486 A1* | 4/2016 | Penilla | H04L 67/12 704/232 |
| 2016/0325758 A1* | 11/2016 | Huang | B60W 50/10 |
| 2017/0177710 A1* | 6/2017 | Burlik | G06F 16/243 |
| 2017/0197636 A1* | 7/2017 | Beauvais | B60W 30/06 |
| 2017/0221480 A1 | 8/2017 | Tzirkel-Hancock et al. | |
| 2017/0286785 A1* | 10/2017 | Schaffer | B60K 37/06 |
| 2017/0297576 A1* | 10/2017 | Halder | B60W 30/18109 |
| 2017/0344003 A1* | 11/2017 | Bostick | B60W 30/00 |
| 2018/0025636 A1* | 1/2018 | Boykin | G11B 27/102 701/1 |
| 2018/0137692 A1* | 5/2018 | Ohmert | G06F 8/65 |
| 2018/0164817 A1* | 6/2018 | Herz | B62D 15/027 |
| 2018/0194344 A1* | 7/2018 | Wang | G05D 1/0221 |
| 2018/0196442 A1* | 7/2018 | Wang | G05D 1/0274 |
| 2018/0197352 A1* | 7/2018 | Ganesh | G07C 5/008 |
| 2018/0239352 A1* | 8/2018 | Wang | G05D 1/0061 |
| 2018/0286413 A1* | 10/2018 | Hassani | G10L 15/22 |
| 2018/0292832 A1* | 10/2018 | Bae | G05D 1/0088 |
| 2018/0299900 A1* | 10/2018 | Bae | G05D 1/0238 |

* cited by examiner

SYSTEM AND METHOD FOR NATURAL-LANGUAGE VEHICLE CONTROL

FIELD

The present disclosure relates to systems, methods and devices for vehicle control, and more particularly to controlling vehicle operation based on natural-language guidance instructions and detected image data.

BACKGROUND

Recent advances in technology allow for autonomous and semi-autonomous vehicles to operate on roadways. These systems often utilize positioning data and one or more navigation applications to determine vehicle routes. In addition these systems use mapping data to process operations of a vehicle. One characteristic of existing systems and processes requires passengers or operators to provide an address or select a point of interest from a map application to provide a destination. One drawback of conventional configurations is that address information is required for the system to determine route and driving operations. As such, conventional systems cannot handle natural-language instructions. In addition, convention systems are limited in that route information is tied to map information available to a vehicle. There exists a need to improve vehicle control systems to allow for guidance instructions to be provided which are not tied to a fixed address. There also exists a need to improve autonomous and self driving systems of vehicles.

BRIEF SUMMARY OF THE EMBODIMENTS

Disclosed and claimed herein are methods, devices and systems for vehicle control. One embodiment is directed to a method including receiving, by a control device, a natural-language guidance instruction to direct operation of a vehicle. The method also includes identifying, by the control device, at least one target based on the guidance instruction and performing, by the control device, object detection on received image data for the at least one target, wherein the image data is received from at least one camera mounted to the vehicle. The method also includes determining, by the control device, a control command in response to the object detection, and controlling, by the control device, operation of the vehicle based on the control command.

In one embodiment, the natural-language guidance instruction is a command for at least one of vehicle route, turn location, and destination.

In one embodiment, the natural-language guidance instruction identifies a point of reference along the directed path of the vehicle, and the natural-language guidance instruction includes an action to be taken at the point of reference.

In one embodiment, identifying at least one target includes determining from the natural-language guidance instruction at least one characteristic of an object and detecting an object match to the characteristic based on a plurality of predefined object classes.

In one embodiment, performing object detection includes identifying objects in the image data and identifying at least one object match to the at least one target.

In one embodiment, the control command is at least one of a continue command, change route command, turn command, and stop command.

In one embodiment, controlling operation includes directing the vehicle along a route in accordance with the natural-language guidance instruction and control command.

In one embodiment, the method also includes outputting a confirmation message in response to the natural-language guidance instruction, the confirmation message including at least one of an audible and visual representation of the natural-language guidance instruction.

In one embodiment, the method also includes plotting route information based on received image data and map data available for the vehicles position.

In one embodiment, the method also includes determining a confidence level based on the object detection, and wherein the control command is determined in response to a confidence level exceeding a predefined threshold.

Another embodiment is directed to vehicle system including a camera and a control device coupled to the camera. The control device is configured to receive a natural-language guidance instruction to direct operation of a vehicle and identify at least one target based on the guidance instruction. The control device is configured to perform object detection on received image data for the at least one target, wherein the image data is received from at least one camera mounted to the vehicle and determine a control command in response to the object detection. The control device is configured to control operation of the vehicle based on the control command.

Other aspects, features, and techniques will be apparent to one skilled in the relevant art in view of the following detailed description of the embodiments.

BRIEF DESCRIPTION OF THE DRAWINGS

The features, objects, and advantages of the present disclosure will become more apparent from the detailed description set forth below when taken in conjunction with the drawings in which like reference characters identify correspondingly throughout and wherein.

DETAILED DESCRIPTION OF THE EXEMPLARY EMBODIMENTS

Overview and Terminology

Figure 1:
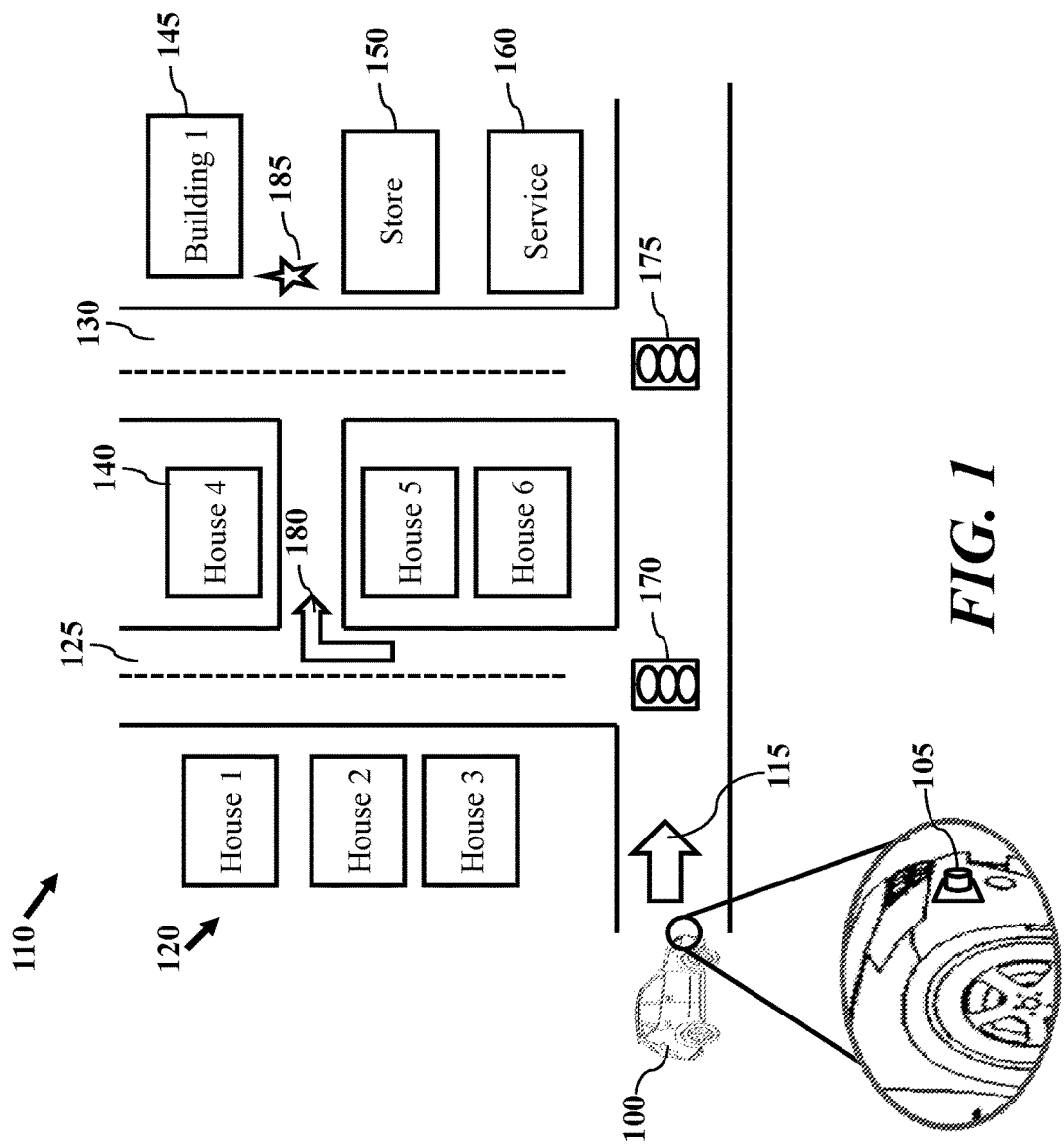
FIG. 1 depicts a graphical representation of vehicle control according to one or more embodiments.

One aspect of the disclosure is directed to controlling vehicle operation with natural-language. In one embodiment, a process is provided to receive a natural-language guidance instruction for a vehicle and determine a control operation for the vehicle based on the guidance instruction. The process may include performing object detection on received image data to fulfill the guidance instructions.

As used herein, natural-language guidance instructions relate to one or more spoken instructions by an operator or passenger of a vehicle. The instructions may provide at least one of an action, such as turn, go forward, stop, merge, etc. The instructions may also provide a reference associated with the action. Unlike map based route determination, natural-language can provide commands that do not rely on specific map items. For example, a natural-language guidance instruction may, "stop after passing the parked cars on the right." In this example, the natural-language guidance instruction is with respect to objects that may be temporarily located in a particular area and will not be stored in an existing map application. Alternatively, natural-language guidance instructions can include one or more commands with respect to mapped items or mapped routes, such as. "Take the second left and then the next right. The house will be the third on the left." In this example, a house is a destination and the route is provided by multiple actions without having to supply an address for the house or the street names of the route.

According to one embodiment, natural-language guidance instructions are fulfilled using one or more cameras mounted to a vehicle providing image data. The image data may include a continuous feed of image data captured from the vehicle. The image data may be used to interpret commands in the natural-language guidance instructions.

Using natural-language guidance instructions and image data allows for control of a vehicle, such as an autonomous or semi-autonomous vehicle, to be routed to one or more destinations when the address is not known by the requestor. In addition, processes and device configurations discussed herein address the problems of controlling an autonomous vehicle with natural language and guiding a machines, such as vehicles, with natural-language Another embodiment is directed to updating a vehicle route using natural-language guidance instructions. By way of example, a vehicle, such as an autonomous or semi-autonomous vehicle, may have a destination and route planned. During the route, a passenger or operator may wish to modify the route. By using natural-language guidance instructions, a route modification may be provided that addresses passenger needs without having to provide specific map data. Possible scenarios for providing route changes may include heavy traffic, road obstruction, road closure, and possible scenarios not accounted for in map data. Alternatively, a passenger may wish to stop at a business that is viewed from the vehicle. Other situations may be to take a preferred or scenic route, avoiding toll, etc.

As used herein, the terms "a" or "an" shall mean one or more than one. The term "plurality" shall mean two or more than two. The term "another" is defined as a second or more. The terms "including" and/or "having" are open ended (e.g., comprising). The term "or" as used herein is to be interpreted as inclusive or meaning any one or any combination. Therefore, "A, B or C" means "any of the following: A; B; C; A and B; A and C; B and C; A, B and C". An exception to this definition will occur only when a combination of elements, functions, steps or acts are in some way inherently mutually exclusive.

Reference throughout this document to "one embodiment," "certain embodiments," "an embodiment," or similar term means that a particular feature, structure, or characteristic described in connection with the embodiment is included in at least one embodiment. Thus, the appearances of such phrases in various places throughout this specification are not necessarily all referring to the same embodiment. Furthermore, the particular features, structures, or characteristics may be combined in any suitable manner on one or more embodiments without limitation.

Exemplary Embodiments

Referring now to the figures, FIG. 1 depicts a graphical representation of vehicle control according to one or more embodiments. According to one embodiment, vehicle 100 is configured with one or more device configurations to perform one or more processes described herein. According to another embodiment, processes and configurations are provided to allow for a vehicle, such as vehicle 100, to understand one or more natural-language guidance instructions. According to yet another embodiment, vehicle 100 includes a camera, such as camera 105. One or more elements of vehicle 100 are configured to perform object detection on image data captured by camera 105 to allow for guidance and control of vehicle 100. Guidance and control of a vehicle may be based on natural-language guidance and detected image data. In certain embodiments, vehicle 100 may be configured to optionally use map data (e.g., points of interest, roadway, address, routing, etc.) for vehicle control.

According to one embodiment, instructions may be provided to vehicle 100 to control the operation of the vehicle and in particular provide vehicle route information. Vehicle 100 is depicted relative to environment 110 in FIG. 1. Environment 110 includes a number of structures, such as homes 120, and objects, such as roads 125 and 130. Environment 100 is depicted as including house 140 (e.g., House 4), building 145 (e.g., Building 1), store 150, service 160 and traffic lights 170 and 175. According to one embodiment, guidance instructions may be provided relative to objects in an environment.

As discussed herein, natural-language guidance can include one or more relative commands to indicate a desired route of vehicle 100 without requiring a known address or the name of a location. Natural-language guidance instructions provided by an operator and/or passenger of vehicle 100 may be used to identify one or more targets to determine a vehicle route or driving operation. FIG. 1 depicts control of vehicle 100 based on one or more natural-language guidance instructions. According to an exemplary embodiment, a natural-language guidance instruction may be:

"Turn left at first light, turn after the second house, and the destination is next to the store."

FIG. 1 depicts one or more elements in environment 100 to fulfill the natural-language guidance instruction. For example, based on a natural-language guidance instruction, vehicle 100 may travel in direction 115 forward towards traffic light 170, turn left on road 125, turn right as shown by 180, and cross road 130 to arrive at designation 185. By way of further example, "turn right at the first light" may be interpreted by vehicle 100 to turn left at traffic light 170. Turn after the second house may be interpreted based on passing two homes to perform right turn 180. Destination 185 may be arrived based on detection of store 150. As will be discussed in more detail, operations of vehicle 100 may be performed based on image data detected by camera 105, and/or one or more other imaging devices of vehicle 100.

Each guidance instruction can include a series of commands which may be used to identify one or more operations for the vehicle to perform and the vehicle route. In contrast to a conventional destination based instruction, natural-language guidance instructions do not provide the name or address of the destination. Also, the natural-language guidance instruction does not require the user to search a user interface for a location or identify a destination from a predetermined list of locations in map data. As will be discussed in more detail below, vehicle 100 can receive the natural-language guidance instruction and determine one or more commands based on the guidance instruction. According to another embodiment, vehicle 100 may be configured to receive natural-language guidance instructions in one or more forms. By way of example, another natural-language format which would result in the same route may be:

"Take the first left, then turn right after one block and stop at the other side of the street."

According to one embodiment, vehicle 100 may receive natural-language guidance instructions when a route is assigned or without assignment of a route or destination. In addition, image data may be detected prior to receiving natural-language guidance instructions.

Natural-language guidance instructions are not limited to the environment depicted in FIG. 1 and may be applied to other roadways. According to one embodiment, natural-language guidance instructions relate to a desired route provided by a passenger or operator of a vehicle that may supplement or be in place of traditional route information. Natural-language guidance instructions may be provided to autonomous or semi-autonomous vehicles (e.g., self driving vehicles, etc.) by one or more voice commands. By using natural-language guidance instructions, problems associated with determining route when a destination address is not known can be overcome. In certain embodiments, natural-language guidance instructions can be used to overcome temporary obstructions to a route, such as roadwork, and provide alternative paths during periods of high traffic. In certain embodiments, natural-language guidance instructions may be typed or provided as text to a user interface. According to one or more other embodiments, identification of targets based on natural-language guidance instructions may include conversion of audio input to components that may be compared to a database of terms to interpret instructions. Neural networks and processes may be employed to identify commands. In addition, commands and interpretations of guidance instructions may be stored for comparison and use in interpreting later detected commands.

According to one embodiment, natural-language guidance instructions may be used to control a vehicle based on image data from at least one camera, such as camera 105. Camera 105 may be a front facing camera. Vehicle 100 may include one or more cameras providing a surround view of vehicle 100 in the driving environment, such as environment 110. Cameras of vehicle 100 may be configured to provide continuous real time object detection. In certain embodiments, camera 105 of vehicle 100 is a front facing camera configured to continuously provide a real time stream of data (e.g., video data, etc.) which may be used by vehicle 100 to perform object detection on and use detected objects to understand natural language commands.

Figure 2:
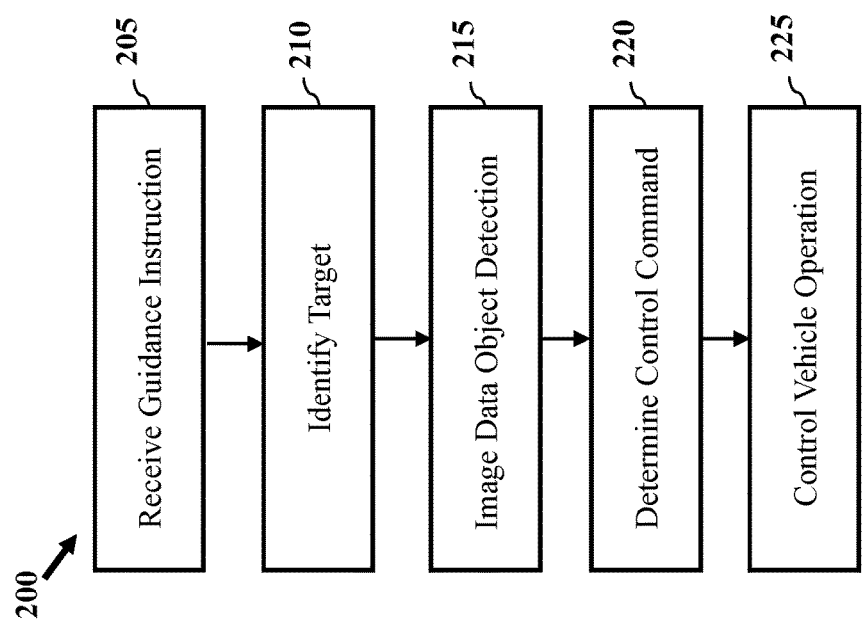
FIG. 2 depicts a process for vehicle control according to one or more embodiments.

FIG. 2 depicts a process for vehicle control according to one or more embodiments. According to one embodiment, process 200 may be performed by a control device of a vehicle (e.g., vehicle 100) to control vehicle operation based on one or more guidance instructions.

Process 200 may be initiated at block 205 with receiving a natural-language guidance instruction to direct operation of a vehicle. In one embodiment, the natural-language guidance instruction is a command for at least one of vehicle route, turn location, and destination. Non-limiting examples include:

Turn left at the light, right after two blocks and stop at the corner;

Keep going down this street until you see a hamburger restaurant, then take a left;

Take the next right and stop at the coffee shop; and

Pass the parked vehicles on the right and then stop in front of the building.

Guidance instructions can include one or more commands and one or more reference points for performing the commands. By way of example, the instruction: "turn right after the parked car" includes the command to turn right, with a reference point being the parked car. Reference points may be targets when processing detected image data. The guidance instruction received at block 205 does not include address information according to one or more embodiments. In addition, the guidance instruction may be relative to one or more elements that may not be provided by a map application.

Guidance instructions can include the use of one or more terms to provide a similar result, such as go forward, keep going, continue, etc. Similarly, destinations may be identified based on several terms which do not reference the name, title or address of map information. In one embodiment, reference guidance instructions may be stored to interpret guidance instructions at block 205. One or more operations of process 200 for interpreting guidance instructions may be trained based on stored references, such as stored reference guidance instructions. The trained operations may be used to interpret new guidance commands as they are received, wherein feedback from the processes may be used to determine how accurate the trained operations performed at interpreting the guidance instructions. The feedback may be an error rate or probability of being correct, and may be used to correct errors in the trained process.

In one embodiment, the natural-language guidance instruction identifies a point of reference along the directed path of the vehicle, and the natural-language guidance instruction includes an action to be taken at the point of reference. Referring to the example of turning right after a parked car, the parked car may be point of reference that can be detected as an object in image data. The parked car may also be a target that is searched for in the image data. Objects such as parked cars, street corners, openings and general structures may be identified based on one or more learning algorithms. Similarly, one or more processes may be used to detect objects within image data.

Guidance instructions may be received at block 205 prior to establishing a route of travel or destination. In other embodiments, guidance instructions may be received during a route when a destination has been identified, such that the guidance instructions modify the current route.

According to one embodiment, guidance instructions received at block 205 may be segmented into commands. Each command may be identified by identifying an action and reference for the action. When multiple commands are provided in the instructions, the commands may be segmented based on the order and presentation format of the guidance instruction. By way of example, "turn left at the first light and go two blocks," may be segmented as a first command to turn left with the reference being a first traffic light and the second command to "go" being associated with the reference two blocks. In this case, the command and reference are inferred from the order of command, reference, command and reference. Each command is paired with the proceeding reference.

According to one embodiment, guidance instructions received at block 205 may be processed to interpret commands, points of reference, and desired actions to be taken. Processing may be performed on instructions received at block 205 by formatting received sound signals to create fingerprints or components of the sound wave which can identify the one or more of sounds, tones, and letters. These components may be used to form words or terms which may be compared to one or more terms stored in a database. One or more deep learning algorithms may be employed for conversion of detected audio, such as speech, to commands in the form of text.

Process 200 may include outputting a confirmation message in response to the natural-language guidance instruction received at block 205. The confirmation message can include at least one of an audible and visual representation of the natural-language guidance instruction.

At block 210, at least one target may be identified based on the guidance instruction. By way of example, identifying at least one target includes determining from the natural-language guidance instruction at least one characteristic of an object and detecting an object match to the characteristic based on a plurality of predefined object classes. By way of further example, the target may be an element to search for in image data based on one or more attributes of the guidance instruction command. With reference to the example of turning right after a parked car, the parked car may be a target. In certain embodiments, the front and rear portions of the parked car may also be targets to be identified from detected image data. Targets can include structures such as a house, building, landmark, road, and traffic light intersection.

Identification of targets at block 210 may be based on one or more deep learning algorithms. In one embodiment, identification of targets at block 210 includes identifying parameters for performing object detection. The parameters can identify at least one of an image data set and image data set characteristics. In one embodiment, targets relate to physical objects to be detected in image data. For example, guidance instructions to turn after a building can result in a target being identified for at least one of the building and an endpoint of the building structure. In certain embodiments, targets can relate to areas of image data not associated with a particular object or structure, such as the space between structures or other repeating elements.

At block 215, object detection is performed on received image data for the at least one target. During operation of a vehicle, a continuous feed of image data may be processed, and objects in the image feed may be detected and classified. Classification may be based on one or more types of objects and objects models. Object detection may include several references for multiple types of vehicles and other objects that may be references in natural-language guidance instructions. A target may be identified by detecting the objects, classifying the objects and then determining whether or not a detected object is the target. With reference to the example of turning right after a parked car, object detection can include detecting a parked car, and the start and end points of the parked car. For example, image data and relative position of the vehicle capturing the image data may be used to route a vehicle around the parked car. Performing object detection may thus include identifying objects in the image data and identifying which objects match the at least one target.

According to one embodiment, object detection at block 215 may be based on one or more of a learning algorithm and neural network. Objects in image data may be determined based on a comparison of one or more frames and processing of the image data. By way of example, in one embodiment image data may be converted to an array of values for the frame. Arrays of two or more frames may be compared to identify and locate objects within the image. In addition to the image arrays, one or more banks of image arrays and image characteristics may be stored and compared to objects. Objects in image data may be scored to determine influence.

One or more processes for object detection at block 215 may be trained based on stored references, such as stored reference, rules and previously detected objects. The trained processes may be used to interpret new objects in image data as they are received, wherein feedback from the processes result may be used to determine how accurate the trained process performed at object detection. The feedback may be an error rate or probability of being correct, and may be used to correct errors in the object detection process.

According to one embodiment, object detection at block 215 may include extracting useful patterns of data from detected image data to distinguish between object classes, such as buildings, homes, roads, intersections, traffic lights, etc. Extraction of patterns may be useful to limit the number of classes considered when identifying objects. In another embodiment, object detection at block 215 may include forming a hierarchy of nonlinear features that increase with complexity, such as layers for dark space, road, and intersection, or layers for an area, building, home, and doorway. Each level of features may allow for simpler interpretation of features in detected image data. Features and layers may be classified to combine one or more features and determine a probability that a detected object meets a target generated based on guidance information.

According to one embodiment, object detection at block 215 may be based on learned patterns for filtering input. Based on one or more targets identified in block 210, filters for performing object recognition at block 215 may be adjusted automatically to extract the most useful information from a detected image. By way of example, object shape may be used as a filter. Object color may be used to distinguish between two similar shaped objects. According to another embodiment, multiple feature maps may be determined and stored for objects. Sub-feature maps may be stored for each feature map including multiple feature mappings at block 215. Classification may be based on features from one or more feature maps determined by process 200.

Process 200 may also include determining a confidence level based on the object detection. As will be discussed in FIG. 7, a confidence level may be determined based on objects detected in image data to determine whether vehicle control should be performed. Confidence levels exceeding a predefined threshold may be grounds for performing a vehicle maneuver.

At block 220, a control command is determined in response to the object detection. According to one embodiment, the control command is at least one of a continue command, change route command, turn command, and stop command. Process 200 determines the control command for operation of a vehicle at block 220 in response to image data detection at block 215. A vehicle may have a defined route heading in a particular direction on a road, wherein the vehicle is searching for a target. The command at block 220 may be to continue traveling. In other embodiments, the command may be to turn or stop the vehicle.

At block 225, the control device controls operation of the vehicle based on the control command. Controlling operation includes directing the vehicle along a route in accordance with the natural-language guidance instruction and control command. Vehicle control may be performed by an autonomous driving module or control system of the vehicle.

Process 200 may also include receiving image data and plotting route information based on received image data and map data available for the vehicles position. Image data detected by a vehicle camera may be used in association with positioning and navigation data. By way of example, positioning (e.g., global positioning data (GPS) and map data may be used to keep a vehicle traveling on defined roads. Detected image data and guidance instructions may be used to determine how where the vehicle travels. In certain embodiments, the natural-language guidance provides an alternative description of a route. The route information provided by the natural-language guidance instructions may result in arriving at a known destination, however, the use of natural guidance allows for regular forms of speech to inform a vehicle.

Figure 3:
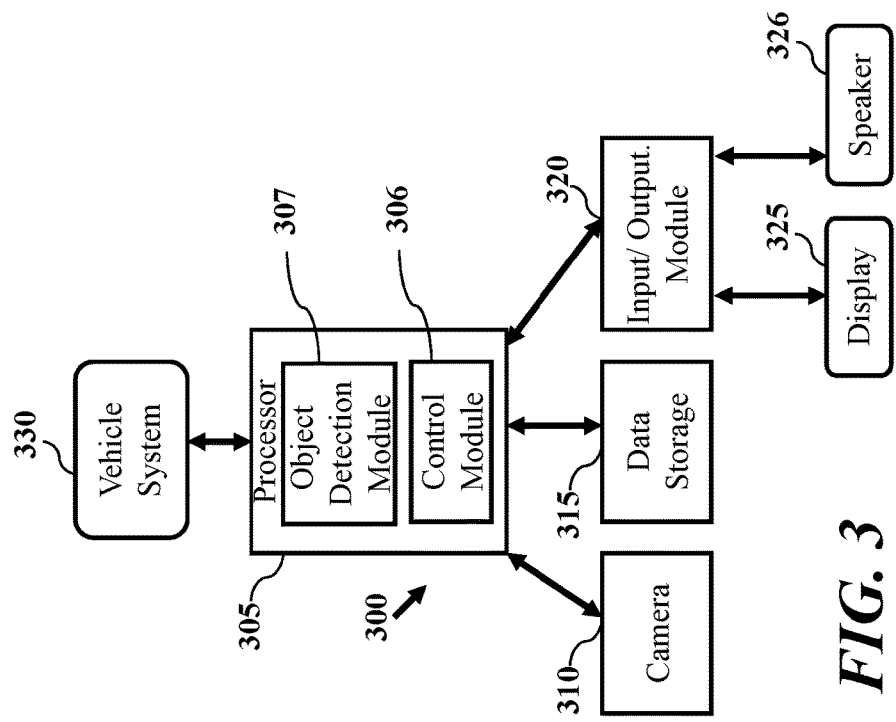
FIG. 3 depicts a graphical representation of device components according to one or more embodiments.

FIG. 3 depicts a graphical representation of device components according to one or more embodiments. According to one embodiment, device 300 relates to a control device of a vehicle configured to control vehicle operation. Device 300 may be configured to control a vehicle based on one or more natural-language guidance instructions. Device 300 includes processor 305, camera 310, data storage unit 315, input/output module 320 and display 325. According to one embodiment, device 300 may interoperate with one or more components of a vehicle system 330 to receive operation characteristics of the vehicle and provide control signals.

Processor 305 is configured to control operation of device 300. According to one embodiment, processor 305 may be configured to provide a control module 306 to generate vehicle commands. Processor 305 may be configured to provide an object detection module 307 to process image data received from camera 310 and perform object detection for one or more objects. In other embodiments, control module 306 and object detection module 307 may be physical hardware units of device 300.

Processor 305 may also function as a control unit to control output and updating of commands to vehicle system 330. Processor 305 may operate based on executable code of control module 306, object detection module 307 and data storage unit 315 to perform and control functions of device 300. By way of example, processor 305 may execute process 200 of FIG. 2 to provide vehicle control. Processor 305 may execute and direct one or more processes and functional blocks described herein to for vehicle control and natural-language guidance instructions.

In certain embodiments, processor 305 may use one or more processes for identifying natural-language commands based on parameters stored by data storage unit 315. By way of example, keywords, terms and phrases may be stored for comparison to received guidance instructions in order to identify commands and reference point associated with the commands. Thus, voice commands detected by input/output module 320 may be converted to text or machine readable representations to interpret commands.

Camera 310 may be mounted to a vehicle to provide a continuous feed of image data to objet detection module 307. Data storage unit 315 may be configured to store executable code to operate processor 305 and device 300. Input/output (I/O) module 320 may be configured to receive inputs from a controller or input surface (e.g., touch screen, input buttons, etc.) and to output image data to display 325. Input/output (I/O) module 320 may operate display 325 and speaker 326 to output confirmation of one or more natural-language guidance instructions.

In certain embodiments, device 300 and processor 305 may be configured to communicate with components of a vehicle, such as vehicle system 330. By way of example, vehicle system 330 may relate to a user interface system of a vehicle including one or more sensors, functions and data capabilities. In that fashion, vehicle system 330 may provide one or more of location data, and vehicle operating data to processor 305, including but not limited to GPS data, heading, acceleration, map information, points of interest, etc.

Figure 4:
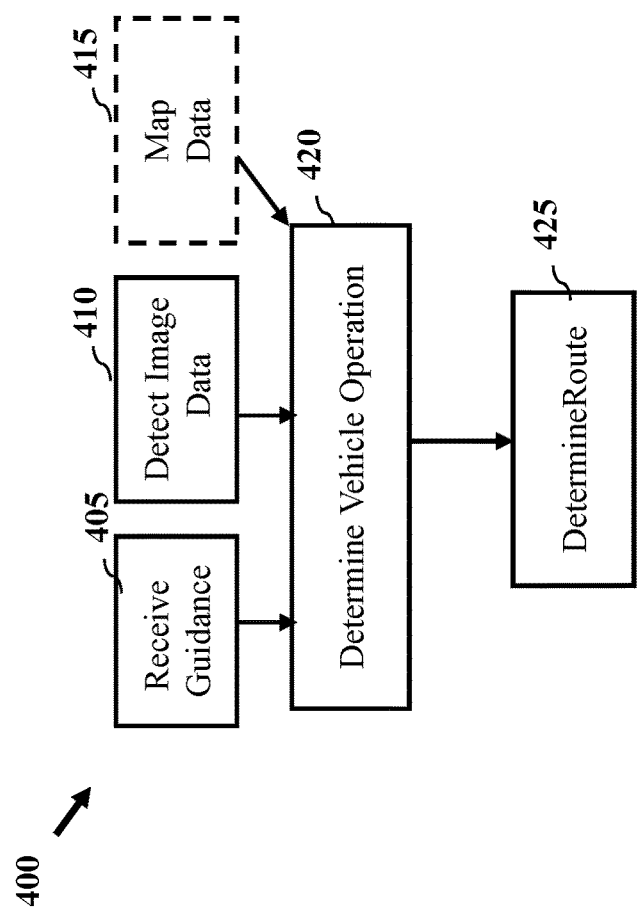
FIG. 4 depicts a process for route determination according to one or more embodiments.

FIG. 4 depicts a process for route determination according to one or more embodiments. According to one embodiment natural-language guidance can be performed when a vehicle is assigned a route or to initially provide a desired route for the vehicle to take. In either situation, one or more sources of guidance, image data, and in some cases map data may be received to control operation of vehicle. Process 400 may be performed by a vehicle control unit. According to one embodiment, vehicle control may be based on one or more natural-language guidance instructions received at block 405 and image data detected at block 410 to determine vehicle operation at block 420. Guidance instructions may be received at block 405 while a vehicle is assigned a route and thus, under control under control. Image data detected at block 415 may be a continuous feed of image data which may be used to control vehicle operation. In certain embodiments, map data may be received and/or used at block 415 for vehicle operation at block 420.

Determining vehicle operation at block 420 can be based on one or more of guidance instructions from block 405, image data at block 410 and optional map data at block 415. For example, when a vehicle route has not been established, the guidance information from block 405 may initiate determination of a route at block 425. Alternatively, guidance instructions may update a determined route or result in a detour at block 425. According to one embodiment, changes in guidance instructions or objects detected in image data can result in updating a route at block 425. Process 400 allows for continuous route updating.

According to one embodiment, route determination at block 425 may be an adaptively learned route/route segment determined based on a recent travel experience. In some examples, the route/route segments may be scored and stored for later comparison.

Figure 5:
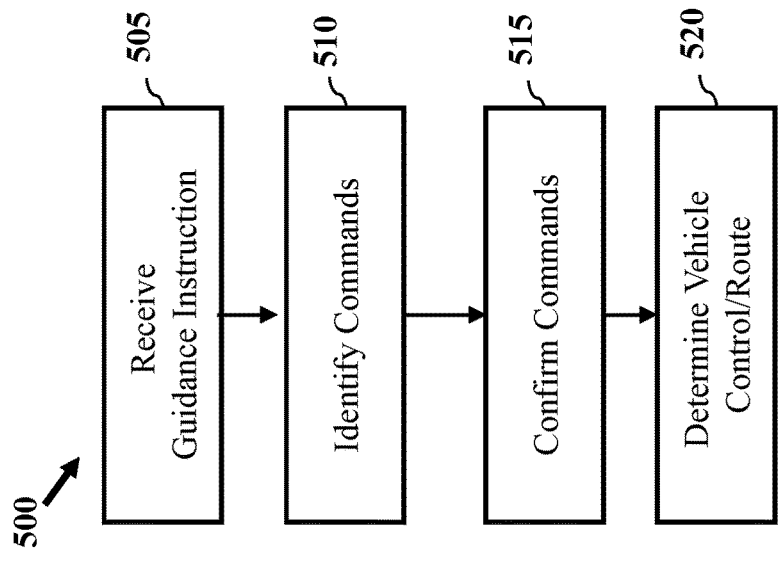
FIG. 5 depicts a process for receiving and handling voice commands according to one or more embodiments.

FIG. 5 depicts a process for receiving and handling voice commands according to one or more embodiments. Natural-language guidance instructions may be provided in one or more forms. The processes described herein may be configured to account for different forms of directions.

Process 500 may be initiated by receiving a guidance instruction at block 505. Guidance instructions may be voice commands from operators or passengers of a vehicle. The guidance instruction received at block 505 may include one or more operations for a vehicle to undertake.

At block 510, one or more commands may be identified based on the guidance instructions received at block 505. Natural-language guidance instructions may provide one or more operations for a vehicle to undertake, such as driving a distance, turning, merging, stopping, or driving in general. In addition, the guidance instructions may provide a point of reference for each operation. As such, each command may include an operation and a point of reference. By way of example, a command may include the operation to turn left, with a point of reference being at the second traffic light. Points of reference may be associates with objects along a route including, roads, entrances, exits, structures, etc. Alternatively, commands may include operations associated with one or more detectable objects that do not include providing an address. For example, a guidance instruction to pass a number of houses or urn after an upcoming restaurant is passed. One or more commands may be identified at block 510 by parsing the guidance instructions based on the term used. Action terms and modifiers may be paired to generate a plurality of commands.

Identification of commands at block 510 may be based on one or more rules for characterizing natural-language guidance instructions. By way of example, one or more predefined phrases may be stored and utilized for comparison or matching of guidance instructions. In other embodiments, in addition to processing the terms included in guidance instructions, timing and rhythm of a user's voice may be analyzed to select particular instructions.

According to one embodiment, identification of commands at block 510 may be based on one or more learning algorithms. Sound waves detected at block 515 may be processed in block 510 by converting the sound waves to sampled representations, and recognizing sounds based on a scoring the highest likelihood. Recognized sounds can influence the next calculation to improve the accuracy associated with identifying spoken commands. Once the sound received is transcribed, one or more terms from the sound may be determined and characterized. Similarly to sound interpretation, the commands inferred may be based on previously recognized terms that influence the interpretation of each command or descriptive elements for the command. Identification of commands at block 510 may be based on training data which allows for unreasonable determinations to be excluded and to allow for improved recognition of terms and commands.

At block 515, one or more commands identified at block 510 may be confirmed. In one embodiment, one or more of a visual representation and audio output may be provided for identified commands. A visual representation can include a graphical transcription or display of terms detected in the guidance instruction that have been identified as commands. An audio confirmation may be an audible transcription output as sound of terms detected in the guidance instruction that have been identified as commands. A vehicle control device may be configured to receive an input by way of a user interface or speech to confirm that the representation of the identified commands is correct. Once the commands are correct the vehicle can determine one of more of control and route operations at block 520.

According to one embodiment, guidance instructions may be compared to map data once received, and/or after confirmation of the commands. Each command may be compared to map data, and in particular existing roadways. The guidance instructions may supplement map data by providing destinations that are not marked or stored as destinations in the map data. Commands from the guidance instructions can be compared to map data to allow for route checking prior to following commands.

According to another embodiment, one or more targets may be associated with each guidance instruction. By way of example, a target may relate to an object that may be detected in image data to notify the vehicle to update course or route of the vehicle. When a command relates to turning after a specific location that is not associated with a map point of interest, the specific location may be a target to be identified in image data.

Figure 6:
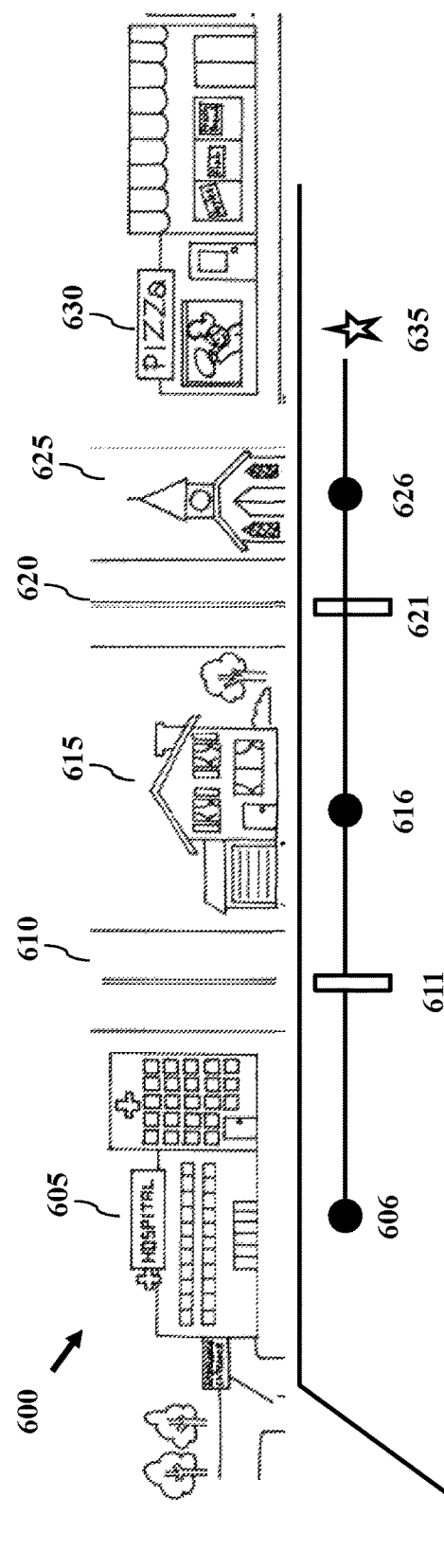
FIG. 6 depicts a graphical representation of object identification according to one or more embodiments.

FIG. 6 depicts a graphical representation of object identification according to one or more embodiments. According to one embodiment, image data captured by a camera mounted to a vehicle may be employed to assist in routing of a vehicle and in particular for control in response to natural-language guidance instructions. Once a guidance instruction is received, objects in image data are detected and classified to determine whether the conditions or parameters of the guidance instruction are met. FIG. 6 depicts an exemplary embodiment for a vehicle route associated with environment 600. Environment 600 includes several fixed objects such as buildings and roads. In some cases, objects of environment 600 may be associated with points of interest of a navigation map system. However, one or more objects may not be associated with the map information other than by address. According to one embodiment, a vehicle mounted camera is configured to detected objects in environment 600.

According to another embodiment, image data may be processed to identify and classify objects. FIG. 6 depicts object 605 (e.g., hospital), roads 610 and 620, house 615, chapel 625 and restaurant 630. Using object detection and recognition, image data received from a camera may be processed. Detected objects of environment 600 may be classified by a control device of the vehicle. In addition to detection of each object, one or more targets may be specified as representing either an event to update the vehicles route or indicate a destination. FIG. 6 depicts elements 606, 611, 621, 616, 626 and 635 for object 605, roads 610 and 620, house 615, chapel 625 and restaurant 635, respectively. Roads 611 and 621 are represented as different objects to represent classification by a control device.

Figure 7:
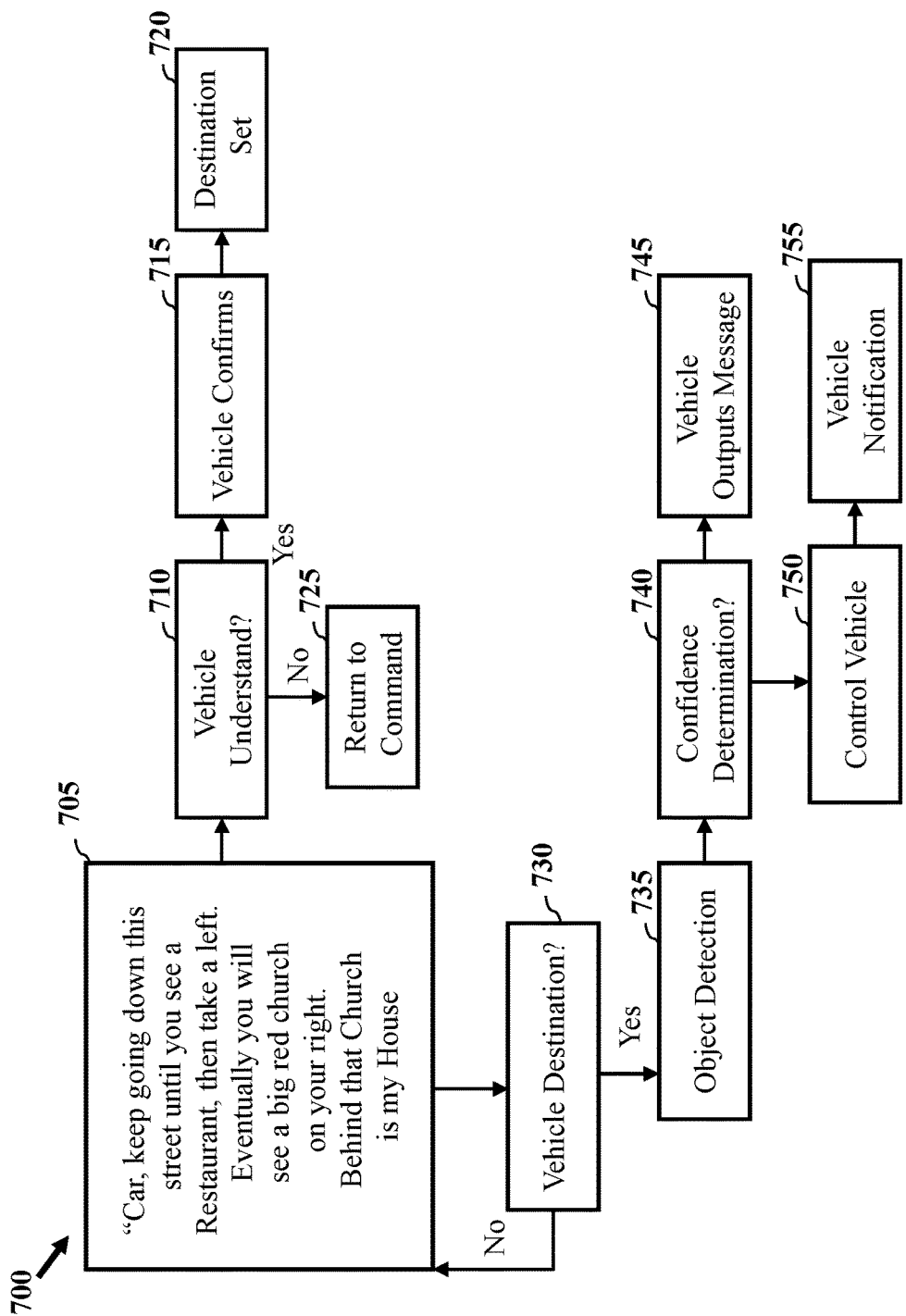
FIG. 7 depicts a graphical representation of natural-language based guidance control process according to one or more other embodiments.

FIG. 7 depicts a graphical representation of natural-language control process according to one or more other embodiments. According to one embodiment, vehicle operation may be directed by a natural-language guidance instruction including a plurality of commands. According to another embodiment, natural-language guidance may be based on understanding guidance instructions and generating a destination, even if the address of the destination is unknown to a requester or the destination is not associated with an existing address of a navigation unit of a vehicle.

Process 700 may be initiated by receiving natural language guidance instruction at block 705 including:

"Car keep going down this street until you see a Restaurant, then take left. Eventually you will see a big red church on your right. Behind that Church is my house."

The guidance instruction at block 705 is an example of multiple commands. A block 710, the control device of the vehicle determines whether the vehicle understands the guidance instruction. When one or more of the commands are not understood ("No" path out of block 710), the control device may return to a receiving mode to receive a command at block 725. When the vehicle understands the command at block 710 ("Yes" path out of block 710), confirmation of the guidance instructions are determined at block 715. A destination may be set at block 720 based on the commands received at block 705.

At block 730, the control device determines is a vehicle destination is set. When a destination is not set ("No" path out of block 730), process 700 returns to receiving one or more guidance instructions. When the destination is set at block 730 ("Yes" path out of block 730), object detection may be performed at block 735 to identify objects and one or more targets. According to one embodiment, a confidence determination may be provided at block 740 to assess the level of confidence in the detected item. At block 746, the control device may out a message related to level of confidence. When the confidence information exceeds a threshold, the vehicle may be controlled at block 750. In addition, a vehicle notification may be presented at block 755.

While this disclosure has been particularly shown and described with references to exemplary embodiments thereof, it will be understood by those skilled in the art that various changes in form and details may be made therein without departing from the scope of the claimed embodiments.

What is claimed is:

1. A method for vehicle control, the method comprising:
   receiving, by a control device, a natural-language guidance instruction to direct operation of a vehicle;
   identifying, by the control device, at least one target based on the guidance instruction to identify parameters for performing object detection in image data, wherein the target is identified to classify objects detected in image data and an endpoint of the target;
   performing, by the control device, object detection on received image data for the at least one target, wherein the image data is received from at least one camera mounted to the vehicle and wherein at least one characteristic of an object is determined based on a plurality of predefined object classes from the natural-language guidance instruction to determine a match to the target;
   determining, by the control device, a control command in response to the object detection and the endpoint of a target; and
   controlling, by the control device, operation of the vehicle based on the control command and the endpoint of the target.

2. The method of claim 1, wherein the natural-language guidance instruction is a command for at least one of vehicle route, turn location, and destination.

3. The method of claim 1, wherein the natural-language guidance instruction identifies a point of reference along the directed path of the vehicle, and the natural-language guidance instruction includes an action to be taken at the point of reference.

4. The method of claim 1, wherein identifying at least one target includes determining from the natural-language guidance instruction at least one characteristic of an object and detecting an object match to the characteristic based on a plurality of predefined object classes.

5. The method of claim 1, wherein performing object detection includes identifying objects in the image data and identifying at least one object match to the at least one target.

6. The method of claim 1, wherein the control command is at least one of a continue command, change route command, turn command, and stop command.

7. The method of claim 1, wherein controlling operation includes directing the vehicle along a route in accordance with the natural-language guidance instruction and control command.

8. The method of claim 1, further comprising outputting a confirmation message in response to the natural-language guidance instruction, the confirmation message including at least one of an audible and visual representation of the natural-language guidance instruction.

9. The method of claim 1, further comprising plotting route information based on received image data and map data available for the vehicles position.

10. The method of claim 1, further comprising determining a confidence level based on the object detection, and wherein the control command is determined in response to a confidence level exceeding a predefined threshold.

11. A vehicle system comprising:
    a camera; and
    a control device coupled to the camera, wherein the control device is configured to:
       receive a natural-language guidance instruction to direct operation of a vehicle,
       identify at least one target based on the guidance instruction to identify parameters for performing object detection in image data, wherein the target is identified to classify objects detected in image data and an endpoint of the target,
       perform object detection on received image data for the at least one target, wherein the image data is received from at least one camera mounted to the vehicle and wherein at least one characteristic of an object is determined based on a plurality of predefined object classes from the natural-language guidance instruction to determine a match to the target,
       determine a control command in response to the object detection and the endpoint of a target, and
       control operation of the vehicle based on the control command and the endpoint of a target.

12. The system of claim 11, wherein the natural-language guidance instruction is a command for at least one of vehicle route, turn location, and destination.

13. The method of claim 1, wherein the natural-language guidance instruction identifies a point of reference along the directed path of the vehicle, and the natural-language guidance instruction includes an action to be taken at the point of reference.

14. The system of claim 11, wherein identifying at least one target includes determining from the natural-language guidance instruction at least one characteristic of an object and detecting an object match to the characteristic based on a plurality of predefined object classes.

15. The system of claim 11, wherein performing object detection includes identifying objects in the image data and identifying at least one object match to the at least one target.

16. The system of claim 11, wherein the control command is at least one of a continue command, change route command, turn command, and stop command.

17. The system of claim 11, wherein controlling operation includes directing the vehicle along a route in accordance with the natural-language guidance instruction and control command.

18. The system of claim 11, further comprising outputting a confirmation message in response to the natural-language guidance instruction, the confirmation message including at least one of an audible and visual representation of the natural-language guidance instruction.

19. The system of claim 11, further comprising plotting route information based on received image data and map data available for the vehicles position.

20. The system of claim 11, further comprising determining a confidence level based on the object detection, and wherein the control command is determined in response to a confidence level exceeding a predefined threshold.

* * * * *